3,306,751
METHOD OF IMPROVING PRETZEL PRODUCTS
John Appleby, Bay City, Mich., assignor to Quality Food Products, Incorporated, Bay City, Mich., a corporation of Michigan
No Drawing. Filed Feb. 27, 1964, Ser. No. 347,669
8 Claims. (Cl. 99—86)

This invention relates to methods of improving the characteristics of pretzel products and more particularly to the treatment of pretzels in a manner to provide what amounts to a new edible product. The invention is particularly concerned with the treatment of bite-size pretzel nuggets and is particularly concerned with startlingly increasing the shelf life of such products and enhancing their edibility by rendering them softer, yet crisp, and at the same time providing them with new and varied flavor characteristics.

One of the prime objects of the invention is to provide a simple and economical method of treating pretzels which softens them without decrisping them, while simultaneously raising their shelf life about 300 percent.

Another object of the invention is to provide a process for accomplishing the purposes described which further accomplishes a controlled degree of de-salting of the product and lends itself to the later incorporation of various salt flavoring ingredients.

In carrying out the present process, conventional pretzel nuggets are most conveniently purchased from a manufacturer of such products. Such pretzels are formed into nugget-size dough pieces by the manufacturers of such products, which are proofed and then baked in a tunnel oven. The dough consists of a mixture of flour, salt, yeast, vegetable shortening, water and malt. Generally speaking, the baking time for such pretzel products is about ten minutes and the baking temperature decreases from a high of about 400° F. in the initial stages of baking to a final bake temperature of about 200°–210° F. Steam is injected into the final stage portion of the tunnel oven to enhance the formation of the crust on the nuggets which is formed during the baking process, and the end product is a pretzel nugget having a relatively hard core covered with an even harder, salt encrusted crust about $\frac{1}{64}$ of an inch in thickness. This crust includes minute pores and cracks which permit the entrance of moisture to the core and the presence of moisture in the core is at least partly responsible for the hard texture of the core. Further, the crust includes embedded particles of pretzel salt which tend to split the crust and facilitate the entrance of moisture to the core.

In carrying out the process of the invention, such conventional pretzels are placed in a coconut oil tank which is maintained at a temperature of about 225° F. near its bottom and about 205° F. at its top. The oil may include various flavor ingredients, including butter flavoring. The pretzel nuggets are placed in a perforate metal screen tray which is first of all positioned in the bottom of the oil tank for a period of about a half a minute. This tends to melt off about 50 percent of the salt on the pretzels, which settles through the oil to a take-off tray as a salt dust. Thereafter, the tray with the pretzels therein is brought up near the surface of the oil in the tank, where it remains for a period of about one minute at a temperature of 205° F.

During the relatively short time the pretzels are cooking in the coconut oil bath, the cores of the nuggets are substantially demoisturized and it is thought that the fibers of the core are also broken down somewhat at these temperatures. The main cooking temperature of 205° F. is substantially the final bake temperature of the tunnel oven in which the pretzels were initially baked.

While it is thought that the temperatures and time of cooking could be varied, the essential matter is that the pretzel nuggets remain in the hot oil for a sufficient period of time for the oil to fully penetrate the crusts of the nuggets. That this occurs is clear because when a processed nugget is sliced open it can be seen that the residue oil ring, which is a different color than the crust and core, has penetrated through the crust and perhaps about $\frac{1}{32}$ of an inch into the exterior of the core. Once this occurs the tray of nuggets is removed from the tank of oil and allowed to drain at normal room temperature until the temperature of the nuggets reduces to about 150° F. While some flavor ingredients were initially incorporated in the coconut oil, additional ingredients in powder form can now be added to the not quite dry nuggets by tumbling them in various flavoring powder mixture preparations which might include onion and garlic powders. Because the products were initially de-salted in the oil bath, it theoretically would be possible to add an additional salt content of about 50 percent by weight at this time. However, in practice only about 25 percent by weight is added. Finally, the finished pretzel nuggets are placed into large cooling bins and moved into a drying area, where they remain for a period of about two hours at a temperature of about 75° F. and in a relative humidity atmosphere of 45 percent. When the somewhat softened, yet crisp, oil-permeated crust is fully dry it is fully sealed in the sense that it is impermeable to the entrance of moisture to the core. It is believed that this accounts for the 300 percent increase in the shelf life of the product and for the maintenance of the softer, and yet crisp, core.

While conceivably various edible oils may be used coconut oil is well suited to my purpose. This oil does not provide a rancidity problem. It is thought that peanut oil would be suitable but would limit the shelf life of the product to about five or six weeks. It should also be possible to employ varying tank temperatures and I believe, for example, that the cooking could be carried out at 190° F. for a period of 2 minutes.

Once the product has been dried it is immediately packaged and is ready for the market. It has a shelf life of about eight to nine months. The treated nuggets provide a highly appetizing, delicious and nutritious snack food which does not absorb moisture and which will remain crisp and tender for long periods of time. The final product contains about .02% to .035% coconut oil by weight essentially in the crust. Most batches of the product contain about .028% coconut oil by weight. The product remains in the tank only a sufficient length of time for the oil to penetrate the crust, since it is desired to avoid soaking the core of the product.

I claim:
1. The method of preparing a pretzel type product comprising: cooking a pretzel, baked from pretzel dough and having a relatively hard texture core with a skin crust thereon formed in baking, in an edible cooking oil for a sufficient time and at a sufficient temperature to permit the oil to fully penetrate substantially only the crust to render it impermeable to moisture vapor while reducing the hardness of the core and rendering it softer, yet crisp; and cooling and drying the pretzel, whereby it is substantially impermeable to the entrance of moisture to the core.

2. The method of preparing a pretzel type product comprising: submersing a pretzel, baked from pretzel dough and having a relatively hard texture core with a salt encrusted skin crust thereon formed in baking, in coconut oil maintained at a temperature of about 225° F. for a sufficient time to melt off a predetermined amount of salt from the pretzel crust; submersing the partially de-salted pretzel in coconut oil maintained at about 205° F. for a sufficient time to permit the oil to fully penetrate substantially only the crust to render it impermeable to moisture vapor and to reduce the moisture content of the core and render it softer, yet crisp; cooling the pretzel to about 150° F.; coating the pretzel with flavoring ingredients including salt ingredients in a predetermined quantity; and cooling and drying the pretzel.

3. The method of preparing a pretzel type product comprising: cooking a pretzel, baked from pretzel dough and having a relatively hard texture core with a relatively hard skin crust thereon formed in baking, in coconut oil maintained at a temperature above 200° F. for a sufficient time to permit the oil to fully penetrate substantially only the crust to render it impermeable to moisture vapor while reducing the moisture content of the core and rendering it softer, yet crisp; and cooling and drying the pretzel, whereby it is substantially impermeable to the entrance of moisture to the core.

4. The method of preparing a pretzel type product comprising: melting off a predetermined amount of salt from a pretzel, baked from pretzel dough and having a relatively hard texture core with a salt encrusted skin crust thereon formed in baking, and cooking the pretzel in cooking oil for a sufficient time to permit the oil to fully penetrate substantially only the crust to render it impermeable to moisture vapor and to reduce the moisture content of the core and render it softer, yet crisp; removing the pretzel from the oil and coating the pretzel with flavoring ingredients including salt ingredients in a predetermined quantity; and cooling and drying the pretzel.

5. The method of preparing a pretzel type product comprising: submersing a pretzel, baked from pretzel dough and having a relatively hard texture core with a salt encrusted skin crust thereon formed in baking, in hot cooking oil for a sufficient time to melt off a predetermined amount of salt from the pretzel crust, and for a sufficient time to permit the oil to fully penetrate substantially only the crust to render it impermeable to moisture vapor while reducing the moisture content of the core and rendering it softer, yet crisp; cooling the pretzel to a predetermined temperature and coating the pretzel with flavoring ingredients including salt ingredients in a predetermined quantity; and cooling and drying the pretzel.

6. The combination defined in claim 1 in which said cooking oil has a flavoring ingredient incorporated therein.

7. The combination defined in claim 6 in which said ingredient is butter flavoring.

8. The method of preparing a pretzel type product from a pretzel baked from pretzel dough and having a relatively hard texture core with a salt encrusted skin crust thereon formed in baking comprising: cooking said pretzel in an edible cooking oil for a sufficient time and at a sufficient temperature to permit the oil to fully penetrate substantially only the crust to render it impermeable to moisture vapor while reducing the hardness of the core and rendering it softer, yet crisp, and to remove about one half the salt on said pretzel; removing the pretzel from the oil and coating the pretzel with flavoring ingredients including salt ingredients; and cooling and drying the pretzel; whereby it is substantially impermeable to the entrance of moisture to the core.

References Cited by the Examiner

UNITED STATES PATENTS

| 1,366,961 | 2/1921 | Shumaker | 99—86 |
| 1,759,608 | 5/1930 | Ehrhart | 107—43 |
| 3,186,852 | 1/1965 | Baker | 99—136 |

OTHER REFERENCES

Bailey, A. E.: Industrial Oil and Fat Products, New York, 1951, Interscience Publishers, Inc., pages 326 and 327.

A. LOUIS MONACELL, *Primary Examiner.*

RAYMOND N. JONES, *Examiner.*